(12) United States Patent
Belew et al.

(10) Patent No.: US 7,879,244 B1
(45) Date of Patent: Feb. 1, 2011

(54) METHOD FOR ANION-EXCHANGE ADSORPTION AND THIOETHER ANION-EXCHANGERS

(75) Inventors: Makonnen Belew, Uppsala (SE);
Bo-Lennart Johansson, Uppsala (SE);
Jean-Luc Maloisel, Enebyberg (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 1955 days.

(21) Appl. No.: 10/148,032

(22) PCT Filed: Nov. 22, 2000

(86) PCT No.: PCT/EP00/11606

§ 371 (c)(1),
(2), (4) Date: Sep. 10, 2002

(87) PCT Pub. No.: WO01/38228

PCT Pub. Date: May 31, 2001

(30) Foreign Application Priority Data

Nov. 22, 1999 (SE) ..................................... 9904197

(51) Int. Cl.
*B01D 15/00* (2006.01)
(52) U.S. Cl. ...................... 210/660; 210/670; 210/683
(58) Field of Classification Search .................. 210/660, 210/670, 683
See application file for complete search history.

(56) References Cited

U.S. PATENT DOCUMENTS 5,652,348 A * 7/1997 Burton et al. .................. 536/20

FOREIGN PATENT DOCUMENTS

| DE | 237 844 A | 7/1986 |
| WO | WO97/29825 A | 8/1997 |
| WO | WO99/65607 A | 12/1999 |

* cited by examiner

*Primary Examiner*—Robert A Hopkins
(74) *Attorney, Agent, or Firm*—Yonggang Ji

(57) ABSTRACT

A method for the removal of a substance, which has a negative charge and which is present in an aqueous liquid (I). The method comprises the steps of: (i) contacting the liquid with an anion-exchanger (1) that comprises mixed mode anion-exchanging ligands in which there is a positively charged nitrogen allowing binding of the substance to the anion-exchanger; and (ii) desorbing said substance from said anion-exchanger. The characteristic feature is that (A) the mixed mode ligands have a thioether linkage within a distance of 1-7 atoms from their positively charged atom, and (B) the anion-exchanger (1) (i) is capable of binding the substance of interest in an aqueous reference liquid (II) at an ionic strength corresponding to 0.25 M NaCl, and (ii) permits in the pH interval 2-12 a maximal breakthrough capacity for the substance which is $\geq 200\%$ of the breakthrough capacity of the substance for Q-Sepharose Fast Flow (anion-exchanger 2).

16 Claims, No Drawings

METHOD FOR ANION-EXCHANGE ADSORPTION AND THIOETHER ANION-EXCHANGERS

FIELD OF INVENTION

The present invention relates a method for the removal of a compound (=substance) carrying a negative charge from an aqueous liquid (I). The method comprises the steps of:
(i) contacting the liquid with an anion-exchanger that comprises a base matrix carrying a plurality of mixed mode anion-exchanging ligands (anion-exchanger) in which there is a positively charged nitrogen under conditions permitting binding between the ligands and the substance, and
(ii) desorbing said substance from said anion-exchanger by the use of a liquid (liquid (II)).

The invention also relates to novel anion-exchangers in which there are mixed mode anion-exchange ligands.

The terms "carrying a negative charge" and "negatively charged" mean that the substance carries one or more negative charges and/or has a negative net charge.

The terms "mixed mode anion exchange ligand" and "bimodal anion exchange ligand", in the context of this invention, refer to a ligand that is capable of providing at least two different, but co-operative, sites which interact with the substance to be bound. One of the sites gives an attractive type of charge-charge interaction between the ligand and the substance of interest. The second site typically gives electron donor-acceptor interaction and/or hydrophobic interactions. Electron donor-acceptor interactions include hydrogen-bonding, π-π, charge transfer, dipole-dipole, induced dipole etc interactions.

BACKGROUND TECHNOLOGY

The method defined above is employed in chromatographic procedures utilizing monolithic matrices or particle matrices in form of packed or fluidised beds, and also in batch-wise procedures. The purpose of the procedures may be to purify a substance carrying a negative charge, in which case the target substance is bound to the matrix, and, if necessary, further purified subsequent to desorption from the matrix. Another purpose is to remove an undesired substance that carries a negative charge from a liquid. In this latter case, the liquid may be further processed after having been contacted with the matrix in step (i). In both cases and if so desired, the matrix may be reused after desorption of the bound substance.

Other uses are assay procedures involving determination of either the substance carrying the negative charge or of a substance remaining in liquid I.

In previous anion-exchange adsorptions, the positively charged ligands typically have comprised nitrogen structures, such as primary, secondary, tertiary or quaternary ammonium structures. In some instances the ligands had a dual or bimodal functionality by comprising both a charged structure and a hydrophobic structure which has required modifications of the desorption protocols.

Simmonds et al (Biochem. J. 157 (1976) 153-159); Burton et al (J. Chromatog. A 814 (1998) 71-81); and Yon et al (Biochem. J. 151 (1975) 281-290) have described anion exchange ligands that comprise saturated hydrocarbon groups.

Crowther et al (J. Chrom. 282 (1983) 619-628); Crowther et al (Chromatographia 16 (1982) 349-353); Wongyai (Chromatographia 38(7/8) (1994) 485-490); Bischoff et al (J. Chrom. 270 (1983) 117-126) have described high pressure liquid chromatography of oligonucleotides and small molecules on reverse phases carrying anion exchange ligands in which there is an aromatic component.

See also Sasaki et al (J. Biochem. 86 (1979) 1537-1548) in which a similar effect from an anion-exchanger based on a hydrophobic matrix is discussed.

Serine proteases have been affinity adsorbed/desorbed to/from matrices to which p-aminobenzamidine has been covalently linked via the para amino group. See
Chang et al (J. Chem. Tech. Biotechnol. 59 (1994) 133-139) who used an adsorption buffer in which the pH is higher and the salt concentration is lower than in the desorption buffer;
Lee et al (J. Chromatog. A 704 (1995) 307-314) who changed the pHs in the same manner as Chang et at but without change in salt concentration; and
Khamlichi et al., J. Chromatog. 510 (1990) 123-132 who used ligand analogues for desorption. The pH-values during adsorption and desorption were the same. Desorption by only increasing the ionic strength failed.

None of the methodologies in these three articles describe successful desorption processes under anion-exchange conditions.

WO 9729825 (Amersham Pharmacia Biotech AB) discloses mixed mode anion-exchangers providing interactions based on charges and hydrogen-bonding involving oxygen and amino nitrogen on 2-3 carbons' distance from positively is charged amine nitrogen. The publication is based on the discovery that this kind of ligands can give anion-exchangers that require relatively high ionic strengths for eluting bound substances.

WO 9965607 (Amersham Pharmacia Biotech AB) discloses cation-exchangers in which there are mixed mode ligands that require relatively high ionic strengths for eluting bound substances.

WO 9729825 (U.S. Pat. No. 6,090,288) and WO 9965607, which give anion and cation exchange ligands, respectively, that require relatively high elution ionic strength are incorporated by reference.

WO 9808603 (Upfront Chromatography) discloses separation media of the general structure M-SP1-L where M is a support matrix that may be hydrophilic, SP1 is a spacer and L comprises a mono- or bicyclic homoaromatic or heteroaromatic moiety that may be substituted (a homoaromatic moiety comprises an aromatic ring formed only by carbon atoms). The substituents are primarily acidic. The separation medium is suggested for the adsorption of proteins, in particular immunoglobulins, by hydrophobic interactions rather than ion-exchange (salt concentration up to 2 M).

WO 9600735, WO 9609116 and U.S. Pat. No. 5,652,348 (Burton et al) disclose separation media based on hydrophobic interaction. Adsorption and desorption are supported by increasing or decreasing, respectively, the salt concentration of the liquid or changing the charge on the ligand and/or the substance to be adsorbed/desorbed by changing pH. The ligands typically comprise a hydrophobic part that may comprise aromatic structure. Some of the ligands may in addition also contain a chargeable structure for permitting alteration of the hydrophobic/hydrophilic balance of the media by a pH change. The chargeable structure may be an amine group.

U.S. Pat. No. 5,789,578 (Burton et al) suggests to immobilise a thiol containing ligand, such as 3-mercaptopropionic acid, gluthathione etc, by addition of the thiol group over carbon-carbon double bond attached to a support matrix. The inventors in this case neither employ nor suggest the use of the material obtained for anion-exchange adsorptions.

Dipolar adsorbents prepared by coupling sulphanilic acid using epichlorohydrin has been described (ligand+spacer= $CH_2CHOHCH_2N^+H_2C_6H_4SO_3^-$) (Porat et al., J. Chromatog. 51 (1970) 479-489; and Ohkubo et al., J. Chromatog. A, 779 (1997), 113-122). The articles do not disclose a separation method in which the ligand is positively, and the substance to be removed negatively, charged.

WPI Abstract Accession No. 86-312313 (=DD-A-237844, Behrend et al) describes the use of 2,4,6-trihalo-1,3,5-triazine for binding substances RHNR'X to carriers inter alia to cellulose. R is hydrogen, aryl or alkyl. R' alkylene or arylene. X is carboxy, sulphonyl, phosphate, phosphonate, boronate, etc.

THE OBJECTIVES OF THE INVENTION

The objectives of the present invention are:
a) to achieve adsorption/binding of negatively charged substances, such as proteins, to anion-exchangers at relatively high ionic strengths;
b) to provide anion-exchange media that can have a reduced ligand content while retaining a sufficient capacity to bind target substances;
c) to enable elution/desorption within broad ionic strength intervals of substances adsorbed/bound to an anion-exchanger;
d) to design anion-exchangers which have high breakthrough capacities, good recovery of proteins (often 95% or higher) etc;
e) to design anion-exchangers that can resist regeneration and/or cleaning with alkaline and or acidic milieu without significant loss of chromatographic properties;
f) to obviate extensive dilutions of samples of high ionic strength that are to be used in processes requiring a lowered ionic strength;
g) to provide simplified desalting procedures;
h) to provide a method for selecting anion-exchangers or anion-exchange ligands that, when bound to a support matrix, are equal or better than a conventional reference anion-exchanger in adsorbing a negatively charged substance;
i) to provide simplified processes involving anion-exchangers, for instance to improve productivity and/or reduce the costs for process equipment and investments;
j) to provide anion-exchangers that are adapted to preparative applications, for instance in large scale processes in which a sample volume (=liquid (I)) larger than a liter are applied and processed on an anion-exchanger;
k) to provide opportunities for novel combinations of separation principles based elution of anion exchange adsorbents at high salt concentration, for instance hydrophobic interaction adsorption after an ion exchange step.

These objectives are based on the recognition that ion exchangers adsorbing at high salt concentrations and high ionic strengths have benefits. This is contrary to traditional ion exchangers which have utilized high salt concentrations and high ionic strengths in the desorption step.

THE DISCOVERY BEHIND THE INVENTION

The present inventors have discovered that ligands containing a thioether linkage in the proximity of the positively charged nitrogen atom may provide anion-exchangers that at least partially meet these objectives. The present inventors have also discovered that inclusion of additional atoms or groups participating in electron donor-acceptor interactions in the proximity of the positively charged atom in the anion-exchange ligands may enhance the strength of the interaction between the substance and the adsorbent.

By proximity in this context is meant that the distance between the thioether sulphur and the positively charged nitrogen is 1-7 atoms, with preference for 2, 3, 4 and 5 atoms. The same distances also apply to the additional atoms and/or groups, if present, that participate in electron donor-acceptor interactions enhancing the binding of the substance to the anion-exchanger.

Electron donor-acceptor interactions mean that an electronegative atom with a free pair of electrons acts as a donor and bind to an electron-deficient atom that acts as an acceptor for the electron pair of the donor. See Karger et al., An introduction into Separation Science, John Wiley & Sons (1973) page 42. Illustrative examples of donor atoms/groups are:

(a) oxygen with a free pair of electrons, such as in hydroxy, ethers, carbonyls, and esters (—O— and —CO—O—) and amides,
(b) sulphur with a free electron pair, such as in thioethers (—S—),
(c) nitrogen with a free pair of electron, such as in amines, amides including sulphone amides],
(d) halo (fluorine, chlorine, bromine and iodine), and
(e) sp- and $sp^2$-hybridised carbons.

Typical acceptor atoms/groups are electron deficient atoms or groups, such as metal ions, cyano, nitrogen in nitro etc, and include a hydrogen bound to an electronegative atom such as HO— in hydroxy and carboxy, —NH— in amides and amines, HS— in thiol etc.

THE INVENTION

The first aspect of the invention is a method for the removal of a substance that carries a negative charge and is present in an aqueous liquid (I). The method comprises step (i) and step (ii) as defined above. The characterizing feature is that
(A) all or a part of the plurality of mixed mode anion exchange ligands have a thioether linkage within a distance of 1-7 atoms from its positively charged atom, and
(B) the anion-exchanger (1) is selected among anion-exchangers according to (A) that are
  (a) capable of binding the substance of interest in an aqueous reference liquid (II) at an ionic strength corresponding to 0.25 M NaCl, and
  (b) permitting somewhere in the pH interval 2-12 a maximal breakthrough capacity for the substance ≧200%, such as ≧300% or ≧500% or 1000%, of the breakthrough capacity of the substance for a conventional anion-exchanger (2) (reference anion-exchanger).

Primarily these percentage figures apply to measurements made during anion exchange conditions, by which is meant that the substance is negatively and the ligand positively charged, preferably as net charges.

An indirect way of finding this kind of anion-exchangers is to screen for anion-exchangers that have an increased maximal elution ionic strength for the substance (carrying the negative charge) compared to the elution ionic strength required for the same substance on a conventional anion-exchanger (reference anion-exchanger). Thus, the anion-exchanger may be selected among those requiring more than 125%, such as more than 140% or more than 200%, of the elution ionic strength required for a conventional anion-exchanger at the particular conditions applied for a selected substance to be removed from liquid (I). See U.S. Pat. No. 6,090,288 (Amersham Pharmacia Biotech AB, corresponds to WO 9729825).

The comparisons above refer to measurements performed under essentially the same conditions for anion-exchanger (1) and (2), i.e. essentially the same support matrix (support material, bead size, pore sizes, pore volume, packing procedure etc), pH, temperature, solvent composition, number of charged ligand having the formula given above etc. The breakthrough capacities are measured at the same relative concentration of the substance in the flow through (for instance $c/c_0=10\%$, for $c/c_0$ see the experimental part). The spacer and coupling chemistry may differ. Certain kinds of coupling chemistries may lead to cross-linking of the support matrix resulting in a more rigid matrix. In this case the flow conditions at which the comparison is made is selected at a level where the matrix is essentially non-compressed.

As a reference ion-exchanger, the commercially available anion-exchanger Q-Sepharose Fast Flow (Amersham Pharmacia Biotech, Uppsala, Sweden) was selected in the context of the present invention. This anion-exchanger is a strong anion-exchanger whose ligand and spacer arm structure are:

—O—$CH_2CHOHCH_2OCH_2CHOHCH_2N^+(CH_3)_3$.

Its chloride ion capacity is 0.18-0.25 mmol/ml gel. The base matrix is epichlorohydrin cross-linked agarose in beaded form. The beads have diameters in the interval 45-165 µm. The exclusion limit for globular proteins is $4\times10^6$.

Anion-exchange ligands as contemplated in the context of the present invention typically have molecular weights <1000, such as <700 daltons excluding the molecular weight contribution of halogens that may be present.

The Mixed Mode Anion-Exchange Ligand

In one variant of the invention the plurality of the mixed mode anion-exchange ligands comprises ligands, each of which together with its spacer (SP) is represented by the formula:

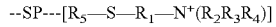
--SP---[$R_5$—S—$R_1$—$N^+(R_2R_3R_4)$]

In the formula --SP---[$R_5$—S—$R_1$—$N^+(R_2R_3R_4)$]:
[$R_5$—S—$R_1$—$N^+(R_2R_3R_4)$] is the ligand;
SP is a spacer that attaches the ligand to the base matrix.
--- represents that the spacer replaces a hydrogen in [$R_5$—S—$R_1$—$N^+(R_2R_3R_4)$].
-- represents a link to the base matrix.

Henceforth the terms lower hydrocarbon group and lower alkyl (including lower alkylene) mean $C_{1-10}$, such as $C_{1-6}$, saturated hydrocarbon groups that optionally are substituted and have carbon chains as discussed below for $R_2$, $R_3$ and $R_4$. See below.

The preferred positively charged structure [—$N^+(R_2R_3R_4)$] in the anion-exchanger have a pKa value that is below 12.0, such as below 10.5. This means that the typical ligand used according to the invention is a primary, secondary or tertiary ammonium group, with preference for primary and secondary. For measurement is of pKa see under the heading "Adsorption" below.

The Group $R_1$ $R_1$ is a bivalent linker group selected among linear, branched or cyclic bivalent hydrocarbon groups, which may or may not contain an aromatic system and/or unsaturation. $R_1$ may also contain one or more atoms or groups participating in hydrogen-bonding or other electron donor-acceptor interactions as defined above. $R_1$ may thus be substituted at one or more positions with a) a primary ammonium groups (—$N^+H_3$) in which one or more of the hydrogens may be replaced with lower alkyl, and/or b) a hydroxy (—OH) in which the hydrogen may be replaced with a lower alkyl.

A carbon chain in a hydrocarbon group may be interrupted at one or more positions by ether oxygen or amine nitrogen.

The preferred hydrocarbon chain between $R_1$—S— and —$N^+(R_2R_3R_4)$ has a length within the interval of 1-20 atoms.

Typical groups for $R_1$ are selected amongst —$CH_2$—, —$CH_2CH_2$—, —$CH_2OCH_2$—, —$CH_2CH_2CH_2$—, —$CH_2CH_2OCH_2CH_2$—, —$CH_2CH(CH_3)$—, —$CH_2N^+(C_2H_5)_2CH_2CH_2$—. One or more hydrogens in these alkylene chains are possibly substituted with a hydroxy and/or a hydroxy lower alkyl or lower alkyl (for instance hydroxy methyl or methyl, respectively) at one or two of their carbon atoms.

Each $sp^3$-hybridised carbon in $R_1$ preferably carries at most one atom selected among oxygen and nitrogen.

An aromatic system in $R_1$ may comprise one or more aromatic rings, for instance a phenylene, a biphenylene or a naphthylene structure and other aromatic ring systems that comprise fused rings or bicyclic structures. Aromatic rings may be heterocyclic, i.e. contain one or more nitrogen, oxygen or sulphur atoms, for instance a pyrimidine, pyrrole, imidazole, thiophene, pyran etc.

The Groups $R_{2-5}$ $R_{2-5}$ is selected among hydrogen and linear, branched or cyclic bivalent hydrocarbon groups, which may or may not contain an aromatic system and/or an unsaturation. The number of carbon atoms in a $R_{2-5}$ hydrocarbon group is typically in the interval of 1-20. The aromatic systems may in principle be the same as those given for $R_1$.

A hydrogen in a $R_{2-5}$ hydrocarbon group may be replaced at one or more positions with a group selected among (a) —$OR''_1$ and/or (b) —$SR'''_1$ and/or (c) —$N^+(R'_2R'_3R'_4)$.

$R'_{2-4}$, $R''_1$ and $R'''_1$ are hydrogen or lower alkyl with the proviso that $R'''_1$ can only be hydrogen if it is replaced by the spacer (SP) when the ligand is bound to the matrix. In addition, a carbon chain in one or more of $R_{2-5}$ may be interrupted at one or more positions by ether oxygen, and/or thioether sulphur and/or amino nitrogen.

That $R_{2-4}$ are hydrocarbon groups includes that one or more of $R_{2-4}$ is a bivalent alkylene forming a 5- or 6-membered ring by having one end attached to the nitrogen and the other replacing a hydrogen in $R_1$, or replacing one of the remaining $R_2$, $R_3$, $R_4$ or $R_5$. In a similar fashion $R_5$ may be a bivalent alkylene with one of its ends attached at the sulphur and the other replacing a hydrogen in $R_1$.

One or more of $R_{2-4}$, $R'_{2-4}$, $R''_1$ and $R'''_1$ are typically selected amongst lower alkyl/alkylene groups, for instance having 1-3 carbon atoms.

Each $sp^3$-hybridised carbon in $R_{2-4}$, $R'_{2-4}$, $R''_1$ and $R'''_1$ should carry at most one atom selected from nitrogen, sulphur and oxygen.

If the spacer (SP) is attached to $R_1$ or to the sulphur atom, then two or three of $R_{2-4}$ are preferably equal to hydrogen. If the spacer is attached to the nitrogen then all $R_{2-4}$ are preferably equal to hydrogen.

In a preferred variant, at least one of $R_{2-4}$ has the formula

and is analogous to the group Ar—$R_1$— in International Patent Application filed in parallel with this case and based on SE 9904197-2 (A method for anion-exchange adsorption and anion-exchangers. Amersham Pharmacia Biotech AB).

Ar is an aromatic ring structure, $R_6$ is $[(L)_nR'_6]_m$ where n and m are integers selected amongst 0 or 1, with preference for (a) m=0 or (b) n=0 when m=1;

L is amino nitrogen, ether oxygen or thioether sulphur;

$R'_6$ is a bivalent linker group selected among 1) linear, branched or cyclic hydrocarbon groups;
2) —C(=NH)—;

The aromatic ring structure Ar may comprise one or more aromatic rings, for instance a phenyl, a biphenyl or a naphthyl structure and other aromatic ring systems that comprise fused rings or bicyclic structures. Aromatic rings may be heterocyclic, i.e. contain one or more nitrogen, oxygen or sulphur atoms. The ring may have further substituents in addition to $R_1$ and a possible spacer. These other substituents may contain an electron donor or acceptor atom or group, for instance enabling hydrogen-bonding.

Illustrative Ar-groups are: hydroxyphenyl (2-, 3- and 4-), 2-benzimadozolyl, methylthioxyphenyl (2-, 3- and 4-), 3-indolyl, 2-hydroxy-5-nitrophenyl, aminophenyl (2-, 3- and 4-), 4-(2-aminoethyl)phenyl, 3,4-dihydroxyphenyl, 4-nitrophenyl, 3-trifluoromethylphenyl, 4-imidazolyl, 4-aminopyridine, 6-aminopyrimidyl, 2-thienyl, 2,4,5-triaminophenyl, 4-aminotriazinyl-, 4-sulphoneamidophenyl etc.

$R'_6$ is a bivalent hydrocarbon group or —C(=NH)—. With respect to hydrocarbon groups they may be selected among the same kind of groups as $R_1$ and $R_{2-5}$.

The Spacer (SP)

The spacer (SP) starts at the base matrix and extends (a) to the nitrogen in —$N^+R_2R_3R_4$) by replacing one of $R_{2-4}$, or (b) to the chain of atoms connecting —$N^+(R_2R_3R_4)$ with $R_5$—S— by replacing a hydrogen in $R_1$, or (c) to the sulphur atom in $R_5$—S— by replacing $R_5$. SP always replaces hydrogen in the ligand [$R_5$—C—$R_1$—$N^+(R_2R_3R_4)$]. It is thus presumed that if the spacer binds directly to the nitrogen or the sulphur atom in the ligand, then the replaced group $R_{2-5}$ has been hydrogen.

The spacer as such is conventional as in traditional ion exchangers and may thus comprise linear, branched, cyclic, saturated, unsaturated and aromatic hydrocarbon groups (e.g. with up to 1-20, such as 1-10 carbon atoms). As discussed above for $R_{1-5}$, hydrocarbon groups may carry hydroxy groups, alkoxy and aryloxy and the corresponding thio analogues, and/or amino groups. Carbon chains may at one or more positions be interrupted by amino nitrogen, ether oxygen, thioether sulphur as discussed above for $R_{1-5}$. There may also be carbonyl groups, such as in amides and ketones, and other groups having the comparable stability against hydrolysis. At most one atom selected from oxygen, sulphur and nitrogen is preferably bound to one and the same $sp^3$-hybridised carbon atom.

SP may provide one or more electron donor or acceptor atoms or groups enhancing binding of the substance to the anion-exchanger as discussed above, for instance by participating in hydrogen-bonding. These atoms or groups may (a) be part of or attached directly to the chain of atoms in the spacer extending from the base matrix to the ligand or (b) be part of a branch group attached to this chain. A branch group in this context is a group which is attached directly to the chain of atoms referred to in the preceding paragraph, and comprises an atom or group participating in electron-donor acceptor interaction, such as hydrogen-bonding.

In a preferred variant, the part of SP binding directly to Ar—$R_1$—$N^+(R_2R_3R_4)$ is:

a carbon with preference for a carbonyl carbon or an $sp^3$-hybridised carbon; or a nitrogen with preference for an amino or amido nitrogen; or a sulphur with preference for a thioether sulphur; or an oxygen, with preference for an ether oxygen;

with the proviso that SP is attached to a carbon in [Ar—$R_1$—$N^+(R_2R_3R_4)$] for (b)-(d).

Typical structures in SP that are attached directly to [Ar—$R_1$—$N^+(R_2R_3R_4)$] are: —$CH_2$—, —$CH_2CH_2$—, —$CH_2CH_2CH_2$—, —$CH_2CH(CH_3)$—, —$C(CH_3)_2$—, —$C(CH_2CH_3)_2$—, —$C(OCH_3)_2$—, —$CH_2OCH_2$—, —$CH_2SCH_2$—, —$CH_2NHCH_2$—, —$CH_2O$—, —$CH_2CH_2O$—, —$CH_2S$—, —$CH_2CH_2S$—, —$CH_2NH$—, —$CONH$—, —$NHCO$—, —$CONH(CH_2)_2SCH_2$—, —$NHCH_2CH_2CH_2CH_2CONH$—, —$CH_2CH_2NH$—, —$CH_2CH(OH)CH_2OCH_2CH(OH)CH_2O$—, (the right valence binds to Ar—$R_1$—$N^+(R_2R_3R_4)$). The remaining part of the spacer may be of the same kind as in traditional ion-exchangers.

The spacer may be introduced according to conventional covalent coupling methodologies including also techniques to be developed in the future. Illustrative coupling chemistries involve epichlorohydrin, epibromohydrin, allyl-glycidylether, bis-epoxides such as butanedioldiglycidylether, halogen-substituted aliphatic substances such as di-chloropropanol, divinyl sulfone, carbonyldiimidazole, aldehydes such as glutaric dialdehyde, quinones, cyanogen bromide, periodates such as sodium-meta periodate, carbodiimides, chloro-triazines, sulfonyl chlorides such as tosyl chlorides and tresyl chlorides, N-hydroxy succinimides, oxazolones, maleimides, 2-fluoro-1-methylpyridinium toluene-4-sulfonates, pyridyl disulfides and hydrazides.

The Base Matrix

The base matrix is based on organic and/or inorganic material.

The base matrix is preferably hydrophilic and in the form of a polymer, which is insoluble and more or less swellable in water. Hydrophobic polymers that have been derivatized to become hydrophilic are included in this definition. Suitable is polymers are polyhydroxy polymers, e.g. based on polysaccharides, such as agarose, dextran, cellulose, starch, pullulan, etc. and completely synthetic polymers, such as polyacrylic amide, polymethacrylic amide, poly(hydroxyalkylvinyl ethers), poly(hydroxyalkylacrylates) and polymethacrylates (e.g. polyglycidylmethacrylate), polyvinylalcohols and polymers based on styrenes and divinylbenzenes, and copolymers in which two or more of the monomers corresponding to the above-mentioned polymers are included. Polymers, which are soluble in water, may be derivatized to become insoluble, e.g. by cross-linking and by coupling to an insoluble body via adsorption or covalent binding. Hydrophilic groups can be introduced on hydrophobic polymers (e.g. on copolymers of monovinyl and divinylbenzenes) by polymerization of monomers exhibiting groups which can be converted to OH, or by hydrophilization of the final polymer, e.g. by adsorption of suitable compounds, such as hydrophilic polymers.

Suitable inorganic materials to be used in base matrices are silica, zirconium oxide, graphite, tantalum oxide etc.

Preferred matrices lack groups that are unstable against hydrolysis, such as silane, ester, amide groups and groups present in silica as such. This in particular applies with respect to groups that are in direct contact with the liquids used.

The matrix may be porous or non-porous. This means that the matrix may be fully or partially permeable (porous) or completely impermeable to the substance to be removed (non-porous), i.e. the matrix should have a Kay in the interval of 0.40-0.95 for substances to be removed. This does not exclude that Kay may be lower, for instance down to 0.10 or even lower for certain matrices, for instance having extenders. See for instance WO 9833572 (Amersham Pharmacia Biotech AB).

In a particularly interesting embodiment of the present invention, the matrix is in the form of irregular or spherical particles with sizes in the range of 1-1000 µm, preferably 5-50 µm for high performance applications and 50-300 µm for preparative purposes.

An interesting form of matrices has densities higher or lower than the liquid. This is kind of matrices is especially applicable in large-scale operations for fluidised or expanded bed chromatography as well as for different batch wise procedures, e.g. in stirred tanks. Fluidised and expanded bed procedures are described in WO 9218237 (Amersham Pharmacia Biotech AB) and WO 9200799 (Kem-En-Tek).

The term hydrophilic matrix means that the accessible surface of the matrix is hydrophilic in the sense that aqueous liquids are able to penetrate the matrix. Typically the accessible surfaces on a hydrophilic base matrix expose a plurality of polar groups for instance comprising oxygen and/or nitrogen atoms. Examples of such polar groups are hydroxyl, amino, carboxy, ester, ether of lower alkyls (such as (—$CH_2CH_2O$—)$_n$H where n is an integer).

The level of anion-exchange ligands in the anion-exchangers used in the invention is usually selected in the interval of 0.001-4 mmol/ml matrix, such as 0.002-0.5 mmol/ml matrix, with preference for 0.005-0.3 mmol/ml matrix. Possible and preferred ranges are among others determined by the kind of matrix, ligand, substance to be removed etc. Thus, the level of anion-exchange ligands is usually within the range of 0.01-0.3 with preference for 0.01-0.1 mmol/ml for agarose based matrices. For dextran based matrices the interval is typically 0.01-0.6 mmol/ml matrix with subrange being 0.01-0.2 mmol/ml matrix. In the certain variants, for instance when $R_1$ is —C(=NH)—, the level of the mixed mode ligand is often at the lower half part of these intervals. In these variants of the invention the levels of anion-exchange ligand thus are smaller than 0.150 mmol per ml matrix and/or smaller than 1 mmol per gram dry weight of matrix. The expression "mmol per ml matrix" refers to fully sedimented matrices saturated with water. The capacity range refers to the capacity of the matrix in fully protonated form to bind chloride ions. It includes a possible contribution also from positively charged groups present other than the group —[$R_5$—S—$R_1$—$N^+(R_2R_3R_4)$], for instance in the spacer or in any of the groups $R_{1-5}$, $R'_{1-4}$ and $R''_1$.

Stability of the Novel Anion-Exchangers

The inventive anion-exchangers/anion-exchange ligands should resist the conditions typically applied in processes comprising anion-exchange absorptions. As a general rule, this means that an anion-exchanger according to the invention should be able to resist 0.1 or 1 M NaOH in water for at least 10 hours with essentially no reduction in total ion binding capacity. By "essentially no reduction in total ion binding capacity" is contemplated that the total ion binding capacity is reduced at most by 10%. In structural terms this means that the anion-exchange ligand in preferred variants should only contain structures selected among pure hydrocarbon groups (including homoaromatic and heteroaromatic structures), thioether and ether groups, disulphide groups, hydroxy groups, sulphoxide or sulphone groups, carboxamide groups, sulphone amide groups, acetal and ketal groups and groups of similar hydrolytic stability.

BEST MODE

The best mode varies with substance of interest and is apparent from the experimental part in which the best ligands discovered so far are given.

Adsorption/Desorption

The adsorption and/or desorption steps may be carried out as a chromatographic procedure with the anion-exchange matrix in a monolithic form or as particles in the form of a packed or a fluidised bed. For particulate matrices, these steps may also be carried out in a batch-wise mode with the particles being more or less completely dispersed in the liquid (e.g. fluidised/expanded bed).

The liquids used in steps (i) and (ii) are aqueous, i.e. water, possibly mixed with a water-miscible solvent.

Adsorption

During adsorption, a liquid sample containing the negatively charged substance is contacted with the anion-exchanger defined above under conditions permitting adsorption (binding), preferably by anion-exchange. In other words the substance is at least partially negative and the ligand at least partially positive.

By anion exchange is contemplated that the substance to be removed carries a negative charge and the anion-exchanger is positively charged (=anion exchange conditions). For an amphoteric substance that is present in an aqueous liquid this means a pH≧pI−0.5, preferably pH≧pI.

In the preferred variants, weak anion-exchangers (preferably present as a primary or secondary amine group in the anion-exchanger) are buffered to a pH within the interval ≦pKa+2, preferably ≦pKa+1. The lower limit can extend down to at least pH=1 or 2 and is primarily determined by the stability of the anion-exchanger in acidic milieu and by the isoelectric point (pI) and stability of the substance to be removed. The pKa-value of an anion-exchanger is taken as the pH at which 50% of its titratable groups are neutralized.

The ionic strength (measured as salt concentration or conductivity) is typically below the elution ionic strength for the particular combination of ion-exchanger, substance to be bound, temperature and pH, solvent composition etc. One of the benefits of the invention is that by using the mixed mode anion-exchangers defined above, it will be possible to perform adsorption/binding also at elevated ionic strengths compared to what normally has been done for conventional ion-exchangers (reference anion-exchangers). By matching the anion-exchanger with the substance to be removed, the adsorption may be carried out at an ionic strength that is higher than when using the conventional ion-exchanger (measured at the same pH and otherwise the same conditions). Depending on the anion-exchanger used the ionic strength may be more than 25% higher such as more than 40% higher than for the reference anion-exchanger as defined above.

In absolute figures the discussion in the preceding paragraph means that adsorption according to the present invention may be performed at ionic strengths above or below 15 or 20 mS/cm. The ionic strength may exceed 30 mS/cm and in some cases even exceed 40 mS/cm. Useful ionic strengths often correspond to NaCl concentrations (pure water) 0.1 M, such as 0.3 M or even 0.5 M. The conductivity/ionic strength to be used will depend on the ligand used, its density on the matrix, the substance to be bound, its concentration etc.

Depending on the anion-exchanger selected, breakthrough capacities 200%, such as ≧300% or ≧500% and even ≧1000% of the breakthrough capacity obtained for a particular substance with the reference anion-exchanger may be accomplished (the same conditions as discussed before).

Desorption

Desorption may be carried out according to established protocols. Preferably the desorption process comprises at least one of the following procedures:
(A) Increasing the salt concentration (ionic strength),
(B) Increasing pH in order to lower the positive charge on the ligands,
(C) Decreasing pH for decreasing a negative charge or for reversing the charge on the substance bound to the matrix,
(D) Adding a ligand analogue or an agent (e.g. a solvent) that reduces the polarity of the aqueous liquid (I).

The conditions provided by (A)-(D) may be used in combination or alone. The proper choice will depend on the particular combination of
(a) substance to be desorbed,
(b) anion-exchanger (ligand, kind of matrix, spacer and ligand density), and
(c) various variables of aqueous liquid II (composition, polarity, temperature, pH etc).

Replacing aqueous liquid I (adsorption buffer) with aqueous liquid II (desorption buffer), thus will mean that at least one variable such as temperature, pH, polarity, ionic strength, content of soluble ligand analogue etc shall be changed while maintaining the other conditions unchanged so that desorption can take place.

In the simplest cases this means:
(a) an increase in ionic strength and/or
(b) a decrease in pH for reducing the negative charge of the substance to be desorbed, when changing from aqueous liquid I to aqueous liquid II. Alternative (a) includes a decreased, a constant or an increased pH. Alternative (b) includes a decreased, an increased or a constant ionic strength.

In chromatographic and/or batch procedures the matrix with the substance to be desorbed is present in a column or other suitable vessel in contact with the adsorption liquid (aqueous liquid I). The conditions provided by the liquid are then changed as described above until the desired substance is eluted from the matrix. After adsorption, a typical desorption process means that the ionic strength is increased compared to that used during adsorption and in many cases correspond to at least 0.4 M NaCl, such as at 0.6 M NaCl, if pH or any of the other variables except ionic strength are not changed. The actual values will depend on the various factors discussed above.

The requirement for using an increased ionic strength for desorption may be less strict depending on the conditions provided by aqueous liquid II. See below.

The change in conditions can be accomplished in one or more steps (step-wise gradient) or continuously (continuous gradient). The various variables of the liquid in contact with the matrix may be changed one by one or in combination.

Typical salts to be used for changing the ionic strength are selected among chlorides, phosphates, sulphates etc of alkali metals or ammonium ions.

Typical buffer components to be used in steps (i) and (ii) are preferably selected amongst acid-base pairs in which the buffering component cannot bind to the ligand, i.e. piperazine, 1,3-diaminopropane, ethanolamine etc. A decrease in pH in step (ii) will reduce the negative charge of the substance to be desorbed, assist desorption and thus also reduce the ionic strength needed for release from the matrix. Depending on the pKa of the ligand used and the pI of the substance to be released, an increase in pH may result in the release of the substance or increase its binding to the ion-exchange matrix.

Desorption may also be assisted by adjusting the polarity of liquid (II) to a value lower than the polarity of the adsorption liquid (I). This may be accomplished by including a water-miscible and/or less hydrophilic organic solvent in liquid II. Examples of such solvents are acetone, methanol, ethanol, propanols, butanols, dimethyl sulfoxide, dimethyl formamide, acrylonitrile etc. A decrease in polarity of aqueous liquid II (compared to aqueous liquid I) is likely to assist in desorption and thus also reduce the ionic strength needed for release of the substance from the matrix.

Desorption may also be assisted by including a soluble structural analogue (ligand is analogue) of the ligand [$R_5$—S—$R_1$—$N^+(R_2R_3R_4)$]. Its concentration in liquid (II) should be larger than its concentration in aqueous liquid (I). A "structural analogue of the ligand" or "ligand analogue" is a substance that has a structural similarity with the ligand and in soluble form inhibits binding between the ligand attached to the matrix and the substance to be removed.

Recovery

In a sub-aspect, the present inventive method enables high recoveries of an adsorbed substance, for instance recoveries above 60% such as above 80% or above 90%. Recovery is the amount of the desorbed substance compared to the amount of the substance applied to an anion-exchanger in the adsorption/binding step. In many instances, the recovery can exceed 95% or be essentially quantitative. Typically the amount of the substance applied to an anion-exchanger is in the interval of 10-80%, such as 20-60%, of the total binding capacity of the anion-exchanger for the substance.

The Substance to be Removed from the Liquid (I).

Removal of a substance according to the invention is primarily carried out in order to purify the substance or some other substance that is present in liquid (I).

The present invention is primarily intended for large molecular weight substances that have several structural units that can interact with mixed mode ligands defined above. Appropriate substances typically have a molecular weight that is above 1000 dalton and/or are bio-organic and/or polymeric. The number of net negatively charged groups per molecule is typically one or more. Preferably the charge of the substances is dependent on pH (i.e. the substance is amphoteric). Among biomolecules those having polypeptide structure, nucleic acid structure, lipid structure, and carbohydrate structure are normally possible to remove from a to liquid according to the invention (provided they have, or can be provided with, a negative charge). In principle the invention is applicable also to other biomolecules and organic substances provided they meet the structural demands given above.

The substance may be dissolved in the aqueous medium or be in the form of small bio-particles, for instance of colloidal dimensions. Illustrative examples of bio-particles are viruses, cells (including bacteria and other unicellular organisms) and cell aggregates and parts of cells including cell organelles.

It is believed that the invention in particular will be applicable to aqueous liquids zo that are derived from biological fluids comprising a substance of interest together with high concentration of salts. The novel anion-exchangers are likely to be extremely useful in desalting, e.g. by enabling adsorption at high ionic strength and desorption at a lowered ionic strength by first changing the pH to reduce the positive charge of the adsorbed substance.

Typical liquids of high ionic strength that contain a target substances of interest are fermentation broths/liquids, for instance from the culturing of cells, and liquids derived therefrom. The cells may originate from a vertebrate, such as a mammal, or an invertebrate (for instance cultured insect cells such as cells from butterflies and/or their larvae), or a microbe (e.g. cultured fungi, bacteria, yeast etc). Included are also plant cells and other kinds of living cells, preferably cultured.

In case aqueous liquid (I) containing the substance to be removed contains particulate matter then it may be beneficial to utilize fluidised particulate support matrices carrying the novel anion-exchange ligands together with an upward flow. Aqueous liquids (I) of this type may originate from (a) a fermentation broth/liquid from the culture of cells, (b) a liquid containing lysed cells, (c) a liquid containing cell and/or tissue homogenates, and (d) pastes obtained from cells.

The Second Aspect of the Invention

This aspect comprises an anion-exchanger (1) comprising a plurality of anion-exchange ligands attached to a hydrophilic base matrix. The ligands plus spacer comply with the formula:

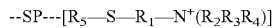

--SP---[$R_5$—S—$R_1$—$N^+(R_2R_3R_4)$]

where the symbols have the same meaning as described previously.

The characteristic feature is that the anion-exchanger (1) has a maximal breakthrough capacity somewhere in the pH-interval 2-12 for at least one of the reference proteins: ovalbumin, conalbumin, bovine serum albumin, β-lactoglobulin, α-lactalbumin, lysozyme, IgG, soybean trypsin inhibitor (STI) which is 200%, such as ≧300% or ≧500% or ≧1000% of the corresponding maximal breakthrough capacity obtained for a Q-exchanger (—$CH_2CH(OH)CH_2N^+(CH_3)_3$ (anion-exchanger 2). The same support matrix, degree of substitution, counter-ion etc are essentially the same in the same sense as discussed above. The running conditions for determining breakthrough capacities of anion-exchanger (1) and anion-exchanger (2) are essentially the same as discussed elsewhere in this text.

Breakthrough capacities are determined under the anion exchange conditions defined under the heading "Selection of anion-exchanger to be used for the removal of a particular substance". The relative breakthrough capacity for each reference substance is in the typical case determined separately by using an aqueous liquid consisting of a buffer and the reference substance for which breakthrough capacity is to be determined.

The various embodiments and their preferences are the same as above. Thus for preferred variants at least one of SP, $R_1$, $R_{2-4}$ and $R_5$ comprises an electron donor and/or an electron acceptor atom or group as defined above for the first aspect of the invention in addition to the thioether linkage $R_5$—S—$R_1$—. Such additional atoms or groups may for instance be capable of participating in hydrogen-bonding and/or be present in a branch in the spacer (SP) or in the chain of atoms connecting the ligand and the base matrix.

The invention will now be illustrated with patent examples. The invention is further defined in the appending claims.

EXPERIMENTAL PART

Part I

Synthesis of Anion-Exchangers

General:

Volumes of matrix refer to sedimented bed volume. Weights of matrix given in gram refer to the suction dried weight. It is understood that these matrices are still water solvated material. For reactions on a large scale, stirring refers to the use of a suspended, motor-driven stirrer since the use of a magnet bar stirrer will to damage the beads. Small-scale reactions (up to 20 ml) were performed in closed vials on a shaking-table. Determination of the functionality and the extent of allylation, epoxidation, or the degree of substitution of ion exchanger groups on the beads were made using conventional methods. Elementary analyses of the gels were also performed especially for analysing of the sulphur content.

A typical example for preparing the anion-exchangers described above is exemplified below using Sepharose 6 Fast Flow (Amersham Pharmacia Biotech, Uppsala, Sweden) as the base matrix.

1. Introduction of Allyl Groups on the Matrix:

In a typical procedure allylation was carried out using allyl glycidyl ether, but note that the introduction of allyl groups on the solid support can as well be easily achieved with using allyl bromide. 80 g of Sepharose 6 Fast Flow was mixed with 0.5 g of $NaBH_4$, 13 g of $Na_2SO_4$ and 40 ml of 50% aqueous solution of NaOH. The mixture was stirred for 1 hour at 50° C. After addition of 100 ml of allylglycidyl ether the temperature of the suspension was maintained at 50° C. and stirred for 18 hours. The mixture was filtered and the gel washed successively with 500 ml distilled water, 500 ml ethanol, 200 ml distilled water, 200 ml 0.2 M acetic acid and 500 ml distilled water.

Titration gave a degree of substitution of 0.3 mmol of allyl/ml of settled gel. It was possible to obtain a degree of substitution of 0.45 mmol of allyl/ml gel by starting from a gel that had been drained (100 ml gel to 75 ml gel).

2. Introduction of Amines Groups on the Matrix:

In a typical procedure the amines groups were introduced on the matrix directly via the nitrogen atom of the amine groups or via the sulphur atom in thiol containing derivatives. Derivatives containing other reactive nucleophilic groups such as phenol for example can as well be used. Coupling to the matrix was realised in preference via bromination of the allyl group and nucleophilic substitution under is basic conditions. In some cases and for thiol-containing derivatives radical addition to the allyl was as well performed. In the case where the attachment point to the gel was achieved via other nucleophilic groups than the amine, the amine group can be introduced as a protected form and a deprotection step is then necessary.

Amine groups can also be introduced by other conventional methods, for example reductive amination.

2.1. Activation of Allyl Sepharose via Bromination:

Bromine was added to a stirred suspension of 100 ml of allyl activated Sepharose 6 Fast Flow (0.4 mmol allyl groups/ml drained gel), followed by 4 g of AcONa and 100 ml of distilled water, until a persistent yellow colour was obtained. Sodium formate was then added till the suspension was fully decolourised. The reaction mixture was filtered and the gel washed with 500 ml of distilled water. A suitable aliquot of the activated gel was then transferred to a reaction vessel and coupled with the appropriate ligand according to the following procedures.

2.1.a. Coupling of 2-Amino-4-(trifluoromethyl)-benzenethiol to Sepharose 6 Fast Flow.

6 g of bromine activated gel (0.4 mmol allyl groups/ml drained gel) were transferred to a reaction vessel containing a solution of 2-Amino-4-(trifluoro methyl)-benzenethiol (2.5 g) in water/DMF (2:1, 4 ml) that has been adjusted to pH 11.5 by addition of a 50% aqueous solution of NaOH. The reaction was stirred for 18 hours at 60° C. The suspension was filtered and the gel was successively washed with 3×10 ml of distilled water, 3×10 ml EtOH, 3×10 ml aqueous 0.5 M HCl and finally with 3×10 ml. The degree of substitution was 0.07 mmol amine group/to ml of gel.

2.1.b. Coupling of 2-(Boc-amino)ethanethiol to Sepharose 6 Fast Flow.

A 30 g quantity of bromine activated gel (0.4 mmol allyl groups/ml drained gel) was transferred to a reaction vessel containing a solution of 2-(Boc-amino)ethanethiol-I (7.35 g) in water/DMSO (1:3, 40 ml). The pH was adjusted to pH 11 with 1 M NaOH. The reaction was stirred for 16 hours at 50° C. After filtration of the reaction mixture the gel was successively washed with 3×50 ml of distilled water, 3×50 ml DMSO, 3×50 ml of distilled water and finally with 3×50 ml of EtOH.

2.1.c. Coupling of Cysteamine to Amino Ethane Thiol Derived Sepharose 6 Fast Flow.

The Boc protected amino ethanethiol gel (6 ml) (from 2.1.c) was treated with a 10% solution of trifluoroacetic acid in $CH_2Cl_2$ (60 ml) for 2 hours at room temperature. The suspension was filtered and the gel was washed successively with 3×10 ml $CH_2Cl_2$, 3×10 ml EtOH, and 3×10 ml of distilled water. The degree of substitution was 0.29 mmol amine group/ml of gel.

2.2. Direct Coupling to the Allyl Group.

2.2.a. Cysteamine Derived Sepharose 6 Fast Flow.

A solution of cysteamine (4.7 g) in MeOH (15 ml) was added to a slurry of 10 ml of allyl activated Sepharose 6 Fast Flow (0.4 mmol allyl groups/ml drained gel) in MeOH (40 ml). The reaction mixture was left under UV irradiation and stirring at 40° C. for 16 hours. The reaction mixture was filtered and the gel was successively washed with 3×10 ml MeOH, 3×10 ml distilled water, 3×10 ml 0.5 M HCl and finally 3×10 ml of distilled water. The degree of substitution was 0.34 mmol amine group/ml of gel.

3. Coupling to Cysteamine Sepharose 6 Fast Flow:

3.1. Boc-L-Phenylalanine Derived Cysteamine Sepharose.

A solution of Boc-L-Phenylalanine N-hydroxysuccinimide ester (0.44 g, 1.2 mmol) in DMF (2 ml) was added to a mixture of cysteamine Sepharose (4 ml, 0.2 mmol amine group/ml gel) and N,N-diisopropylethylamine (1 mmol) in DMF (5 ml). The reaction was allowed to continue for 18 hours at room temperature. The reaction mixture was filtered and the gel was washed successively with 3×10 ml DMF, 3×10 ml acetone, and finally 3×10 ml of distilled water. Residual amine groups were calculated to be 0.033 mmol amine group/ml of gel after titration.

3.2. L-Phenylalanine Derived Cysteamine Sepharose.

The Boc protected L-phenylalanine derived cysteamine gel (3 ml) (from 3.1 or 2.1.d) was treated with a 10% solution of trifluoroacetic acid in $CH_2Cl_2$ (4 ml) for 2 hours at room temperature. The reaction mixture was filtered and the gel was washed successively with 3×10 ml $CH_2Cl_2$, 3×10 ml acetone, and 3×10 ml of distilled water. The degree of substitution of the product was 0.19 mmol amine group/ml of gel.

3.3. Fmoc-L-Tyrosine Derived cysteamine Sepharose.

A solution of Fmoc-L-tyrosine N-hydroxysuccinimide ester (1.1 mmol) in DMF (3 ml) was added to a slurry of cysteamine Sepharose (3.3 ml, 0.3 mmol amine group/ml gel) in DMF (5 ml). The mixture was stirred for 18 hours at room temperature. The suspension was filtered and the gel was washed with 3×10 ml DMF.

3.4. L-Tyrosine Derived Cysteamine Sepharose:

The Fmoc protected L-tyrosine derived cysteamine gel (3.3 ml) (from 3.3) was treated with a 10% solution of 1,8-diazabicyclo[5,4,0]-undec-7-ene in DMF (10 ml) for 18 hours at room temperature. The reaction mixture was filtered and the gel was washed successively with 3×10 ml DMF, 3×10 ml acetone, and 3×10 ml of distilled water. The degree of substitution was 0.28 mmol amine group/ml of gel.

Part II

Chromatography

To verify that the ligands suggested in this invention adsorb proteins at higher ionic strengths than the reference anion-exchanger, breakthrough capacities of bovine serum albumin (BSA) was determined. The new "high-salt" anion-exchange ligands attached to Sepharose Fast Flow were compared to Q Sepharose Fast Flow in this study. Furthermore, the elution conductivity of three proteins, namely conalbumin (Con A), lactalbumin (Lactalb) and soybean trypsin inhibitor (STI), was also determined for all anion-exchangers. This function test was used to verify retardation at high salt conditions for other proteins as well. Four of the "high-salt" anion exchange ligands with high breakthrough capacities were also tested with respect of recovery of the protein (BSA) applied.

A. Breakthrough Capacity (Qb10%) at High Salt Condition

The Qb10%-value was evaluated at relatively high concentration of salt (0.25 M NaCl) relative to the reference anion-exchanger Q Sepharose Fast Flow that was operated under identical conditions. The Qb10%-values for the different anion-exchangers were determined using the method of frontal analysis described below.

Experimental

I. Buffer and Sample Solutions

The sample solution was BSA dissolved in 20 mM piperazin (pH=6.0) with 0.25 M NaCl added. The concentration of BSA was 4 mg/ml. Buffer and sample solutions were filtered through 0.45 μm Millipore Millex HA filters before use.

II. Chromatographic System

All experiments were performed at room temperature using Äkta Explorer 100 chromatography system (amersham Pharmacia Biotech AB, Uppsala, Sweden) equipped with Unicorn 3.1 software. Samples were applied to the column via a 150 ml superloop. A flow rate of 1 ml/min (ca 300 cm/h) was used throughout. The effluents were monitored continuously by absorbance measurements at 280 nm using a 10 mm flow cell.

III. Frontal Analysis

Each prototype anion-exchanger was packed in a HR 5/5 column (packed bed volume=1) and equilibrated with the piperazine buffer (20 mM piperazin, pH=6.0, with 0.25 M NaCl). The breakthrough capacity ($Q_b$) was evaluated at 10% of the maximum UV detector signal (280 nm). The maximum UV signal was estimated by pumping the test solution directly into the UV detector. The breakthrough capacity was calculated from the retention volume at 10% height of the maximum signal after correction of the dead volume.

A column equilibrated with the piperazine buffer was continuously fed (via a 150 ml superloop) with the sample solution at a flow rate of 1 ml/min (i.e. ca. 300 cm/h). The application of sample was continued until the $A_{280}$ of the effluent reached a level of 10% of $A_{280}$ of the sample solution. On the basis of data so obtained (i.e. volume of the packed gel bed ($V_c$), its void volume, flow rate and concentration of BSA to the column), the breakthrough capacity of the gel (Qb10%) can be calculated. The results obtained have formed the basis for screening a large number of "high salt ligand" candidates and the results will be presented below.

IV. Evaluation

The breakthrough capacity at a level of 10% of absorbance maximum of the BSA sample solution (QbBSA) was calculated with the formula:

$$QbBSA = (T_{R10\%} - T_{RD}) \times C/Vc$$

where:

$T_{R10\%}$=retention time at 10% of absorbance maximum (min)

$T_{RD}$=Dead time in the system (min)

C=Concentration of BSA (4 mg/mL)

$V_C$=Column volume (mL)

B. Function Test

The anion-exchange media were packed in 1.0 ml HR 5/5 columns and equilibrated with 20 column volumes of the A-buffer (20 mM phosphate buffer; pH 6.8). 50 μl of a protein mixture (6 mg/ml Con A, 4 mg/ml Lactalbumin and 6 mg/ml STI) were applied to the column and eluted with a linear gradient (gradient volume=20 column volumes) to 100% of the B-buffer (A-buffer plus 2.0 M NaCl). The flow rate was adjusted to 0.3 ml/min (100 cm/h). All experiments were performed at room temperature using Äkta Explorer 100 chromatography system equipped with Unicorn 3.1 software.

C. Recovery of BSA Bound to "High Salt" Anion Exchange Ligands

Details concerning type of column, packed bed volume, buffers, protein solution, flow rate and type of apparatus are outlined above. To a column equilibrated with piperazin buffer (20 mM piperazin, pH=6.0, with 0.25 M NaCl) was applied a solution of BSA from a 50 ml super loop until an amount corresponding to 30% of its breakthrough capacity was applied. The column was then washed with 2 bed volumes of the equilibrium buffer and the bound BSA was eluted with the appropriate de-sorption buffer. In case of ligands (Tyrosine) and (2-Aminobenzimidazole) adsorbed BSA were eluted with a piperazine buffer (20 mM piperazin, pH=6.0, with 2.0 M NaCl). In addition, adsorbed BSA on ligands (Octopamine) and (Tyrosinol) were eluted with a TRIS buffer (0.2 M TRISS, pH=9.0, with 2 M NaCl).

Results

The results obtained for breakthrough capacities for a series of representative "high salt" anion exchange ligands are summarised in Table 1 and the structures of the ligands are depicted in section part III. The degree of ligand substitution on the majority of these new anion-exchangers was ca. 0.05-0.3 mmol/ml packed gel. As a reference anion-exchanger, the commercially available Q Sepharose Fast Flow was used. The ligand density is in the same range as the new series of anion-exchangers. The results indicate the following trends.

1. The innovative anion-exchange ligands have much higher elution conductivity for all three proteins compared to the reference anion-exchanger Q Sepharose Fast Flow (Table 1).
2. The innovative anion-exchange ligands have also a much higher breakthrough capacity for BSA (QbBSA) compared to Q Sepharose Fast Flow. The ligand that gave the highest Qb-value corresponds to an increase of 4300% relative the reference anion-exchanger. Of the presented ligands (Table 1), the one that gave the lowest Qb-value corresponds to a 500% increase compared to Q Sepharose Fast Flow.
3. All good anion-exchange ligands are primary or secondary amines or both primary and secondary amines. No good ligand based on a quartenary amine has been found.

TABLE 1

Elution conductivity at pH 6 for three proteins and breakthrough capacity of BSA (pH 6 and 0.25 M NaCl) on different anion-exchangers.

| Ligand | Ligand density mmol/ml | Breakthrough capacity QbBSA (mg/ml) | Elution conductivity | | |
|---|---|---|---|---|---|
| | | | ConA (mS/cm) | Lactalbumine (mS/cm) | STI (mS/cm) |
| Q Sepharose Fast Flow | 0.21 | 1 | 12 | 20 | 30 |
| 1. Thiomicamine | 0.13 | 43 | ne | ne | ne |
| 2. Phenylalanine/cysteamine | 0.20 | 33 | ne | ne | ne |
| 3. Benzylcysteine/cysteamine | na | 25 | ne | ne | ne |
| 4. 2-Amino-4-(trifluoromethyl)-benzenethiol | 0.01 | 21 | ne | ne | ne |
| 5. 4,6-Diamino-2-mercapto pyrimidine | 0.10 | 14 | ne | ne | ne |
| 6. Treophenylserine/cysteamine | na | 14 | 29 | 54 | 78 |
| 7. 4-Aminothiophenol | 0.05 | 13 | ne | ne | ne |
| 8. Thienylserine/cysteamine | na | 12 | 27 | 50 | 72 |
| 9. 4-Amino-1,3,5-triazine-2-thiol | 0.07 | 9 | na | na | na | ne = not eluted,
na = not analysed

Part III

Ligands

The best ligands tested was derived from the following compounds:

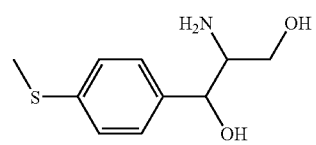

1. Thiomicamine: $R_1$=-p-$C_6H_4$—CH(OH)—CH($CH_2$OH)—, $R_{2-4}$=hydrogen, $R_5$=methyl SP ends with —CH$_2$CH(OH)CH$_2$O— and is attached to the amino group by replacing one of its hydrogens (=R$_1$).

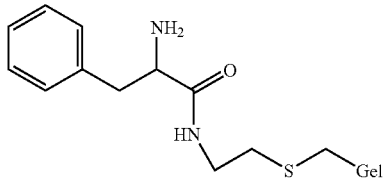

2. Phenylalanine/cysteamine: R$_1$=—CH(CH$_2$C$_6$H$_5$)—CO—NH—(CH$_2$)$_2$—, R$_{2-4}$=hydrogen,
SP ends with —CH$_2$— and is attached at a mercapto group by replacing its hydrogen (=R$_5$).

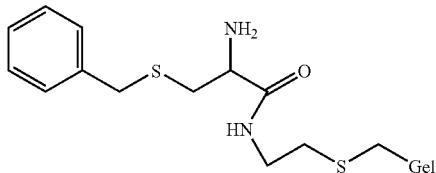

3. Benzylcysteine/cysteamine: R$_1$=—CH$_2$—CH<, R$_{2-4}$=hydrogen, R$_5$=benzyl, SP ends with —CONHCH$_2$CH$_2$SCH$_2$— and is attached to R$_1$.

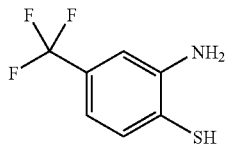

4. 2-Amino-4-(trifluoromethyl)-benzenethiol: R$_1$=4-trifluoromethyl-1,2-phenylene, R$_{2-4}$=hydrogen, SP is attached at the mercapto group by replacing its hydrogen (=R$_5$).

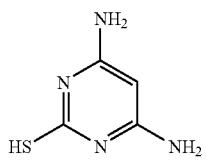

5. 4,6-diamino-2-mercaptopyrimidine: R$_1$=4-amino-1,6-pyrimidinediyl, R$_{2-4}$=hydrogen SP is attached at the mercapto group by replacing its hydrogen (=R$_5$).

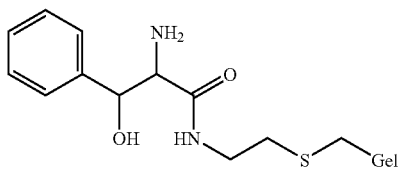

6. Treophenylserine/cysteamine: R$_1$=—CH—(CH(OH)C$_6$H$_5$)—CO—NH—CH$_2$CH$_2$—, R$_{2-4}$=hydrogen, SP ends with —CH$_2$— and is attached at a mercapto group by replacing its hydrogen (=R$_5$).

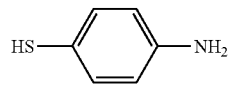

7. 4-aminothiophenol: R$_1$=1,4-phenylene, R$_{2-4}$=hydrogen, SP ends with —CH$_2$— and is attached at the mercapto group by replacing its hydrogen (=R$_5$).

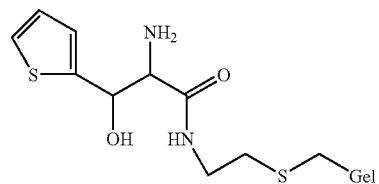

8. Thienylserine/cysteamine: R$_1$=—CH(CH(OH)$_2$-thienyl)-CO—NH—CH$_2$CH$_2$—, R$_{2-4}$=hydrogen, SP ends with —CH$_2$— and is attached at a mercapto group by replacing its hydrogen (=R$_5$).

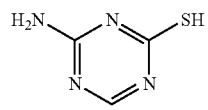

9. 4-amino-1,3,5-triazine-2-thiol: R$_1$=1,3,5-triazin-2,6-diyl, R$_{2-4}$=hydrogen, SP ends with —CH$_2$— and is attached at the mercapto group by replacing its hydrogen (=R$_5$).

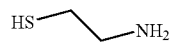

10. 2-amino-ethanethiol: R$_1$=—CH$_2$—CH$_2$—, R$_{2-4}$=hydrogen, SP ends with —CH$_2$— and is attached to the mercapto group by replacing a hydrogen (=R$_5$). QbBSA=14 mg/ml (by UV coupling 17 mg ml)

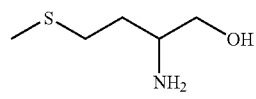

11. Methioninol: R$_1$=—CH$_2$—CH$_2$—CH—(CH$_2$OH)—, R$_{2-4}$=hydrogen, R$_5$=methyl SP ends with —CH$_2$CH(OH)CH$_2$O— and is attached to the amino group by replacing one of its hydrogens (=R$_1$).

What is claimed is:

1. A method for the removal of a substance carrying a negative charge from an aqueous liquid (I), said method comprising the steps of
    i) contacting the liquid with an anion-exchanger (1) that comprises a base matrix carrying a plurality of mixed mode anion-exchanging ligands in which there is a positively charged nitrogen under conditions permitting binding between the ligands and the substance; and
    ii) desorbing said substance from said anion-exchanger by the use of a liquid (liquid (II)), wherein
(A) all or a part of the plurality of mixed mode anion-exchange ligands have a thioether linkage within a distance of 1-7 atoms from its positively charged nitrogen, and
(B) the anion-exchanger (1) is
(a) capable of binding the substance of interest in an aqueous reference liquid (II) at an ionic strength corresponding to 0.25 M NaCl, and
(b) exhibits in the pH interval 2-12 a maximal breakthrough capacity for the substance of at least 200% of the breakthrough capacity of the substance for Q-Sepharose Fast Flow, said anion-exchangers having essentially the same ligand density and breakthrough capacities being determined under the same conditions.

2. The method of claim 1, wherein each thioether-containing anion exchange ligands are of the formula:

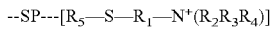
--SP---[$R_5$—S—$R_1$—$N^+$($R_2R_3R_4$)]

where:
SP is a spacer that attaches the ligand [$R_5$—S—$R_1$—$N^+$($R_2R_3R_4$)] to the base matrix,
--- represents that the spacer replaces a hydrogen in [$R_5$—S—$R_1$—$N^+$($R_2R_3R_4$)],
-- represents a link to the base matrix,
$R_1$ is a bivalent group selected among linear, branched or cyclic hydrocarbon groups, and
$R_{2-5}$ are monovalent groups selected among the same kind of hydrocarbon groups as $R_1$ or divalent forms of these hydrocarbon groups, with the proviso that a carbon chain in $R_{2-5}$ possibly is interrupted at one or more positions by a thioether sulphur.

3. The method of claim 1, wherein at least one of the anion-exchange ligands and/or the anion-exchanger has a pKa $\leq$12.

4. The method of claim 2, wherein $R_1$ contains one or more of the following
(a) an aromatic system,
(b) unsaturation,
(c) one or more atoms or groups participating electron donor-acceptor interactions,
(d) a carbon chain that is interrupted at one or more positions by ether oxygen, and/or amine nitrogen, at least one of said one or more atoms or groups participating in electron donor acceptor interactions being at a distance within the interval of 1-7 atoms from the positive nitrogen atom.

5. The method of claim 2, wherein at least one of said one or more atoms or groups participating electron-donor-acceptor interactions are present are present in a branch in SP or as a part of the chain of atoms in SP extending from the base matrix to the ligand.

6. The method of claim 2, wherein SP includes
(a) a carbon atom with preference for a carbonyl carbon or an $sp^3$-hybridised carbon; or
(b) a nitrogen atom with preference for an amino or amido nitrogen; or
(c) a sulphur atom with preference for a thioether sulphur atom; or
(d) an oxygen, with preference for an ether oxygen atom; directly attached to the ligand [$R_5$—S—$R_1$—$N^+$($R_2R_3R_4$)];
with the proviso that SP always is attached to a carbon in $R_1$ for (b)-(d).

7. The method of claim 1, wherein the ionic strength during the adsorption/binding step (i) is larger or equal with the ionic strength of 0.25 M NaCl water solution.

8. The method of claim 1, wherein the pH of aqueous liquid (I) is $\leq$pKa+2 of the anion-exchanger or of ligands [$R_5$—S—$R_1$—$N^+$($R_2R_3R_4$)].

9. The method of claim 1, wherein the pH of the aqueous liquid (II) is different from the pH of aqueous liquid (I) in order to decrease the negative charge of the substance.

10. The method of claim 1, wherein the polarity of the aqueous liquid (II) is lower than the polarity of aqueous liquid (I).

11. The method of claim 1, wherein the aqueous liquid (II) includes a structural analogue of the ligand in a larger concentration than in the aqueous liquid (I).

12. The method of claim 4, wherein
(i) said electron donor-acceptor interaction is hydrogen bonding and/or
(ii) donor atoms/groups are selected among:
(a) oxygen with a free pair of electrons, such as in hydroxy, ethers, carbonyls, and esters (—O— and —CO—O—) and amides,
(b) sulphur with a free electron pair, such as in thioether (—S—),
(c) nitrogen with a free pair of electron, such as in amines, amides including sulphone amides,
(d) halogen (fluorine, chlorine, bromine and iodine), and
(e) sp- and $sp^2$-hybridised carbons; and/or
(iii) acceptor groups are selected amongst groups that consists of a electron-deficient atom, such as hydrogen, and/or an electronegative atom.

13. The method of claim 3, wherein the anion-exchange ligands containing thioether linkages are primary or secondary amines.

14. An anion-exchanger (1) comprising a plurality of anion-exchange ligands each of which is attached via a spacer to a hydrophilic base matrix, wherein
(a) each ligand plus spacer has the formula:

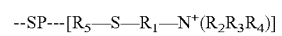
--SP---[$R_5$—S—$R_1$—$N^+$($R_2R_3R_4$)]

wherein
(i) SP is a spacer that attaches the ligand [$R_5$—S—$R_1$—$N^+$($R_2R_3R_4$)] to the base matrix,
(ii) --- represents that the spacer replaces a hydrogen in [$R_5$—S—$R_1$—$N^+$($R_2R_3R_4$)],
(iii) -- represents a link to the base matrix,
(iv) $R_1$ is a bivalent group selected among linear, branched or cyclic hydrocarbon groups, and
(v) $R_{2-5}$ are monovalent groups selected among the same kind of hydrocarbon groups as $R_1$ or divalent forms of these hydrocarbon groups, with the proviso that a carbon chain in $R_{2-5}$ possibly is interrupted at one or more positions by a thioether sulphur;
(b) the anion-exchanger (1) has a maximal breakthrough capacity in the pH-interval 2-12 for at least one reference protein selected amongst ovalbumin, conalbumin, bovine serum albumin, β-lactoglobulin, α-lactalbumin, lysozyme, IgG, soybean trypsin inhibitor (STI) which is at least 200% of the maximal breakthrough capacity in the pH-interval 2-12 obtained for a Q-exchanger (—$CH_2CH(OH)CH_2N^+(CH_3)_3$) (anion-exchanger 2), the support matrix, degree of substitution, counter-ion and running conditions being the same for anion-exchanger (1) and anion-exchanger (2).

15. The anion-exchange of claim 14, wherein the relative breakthrough capacity is measured under anion exchange conditions.

16. The anion exchanger of claim 14, wherein $R_1$ contains one or more of the following
 (a) an aromatic system,
 (b) unsaturation,
 (c) one or more atoms or groups participating electron donor-acceptor interactions,
 (d) a carbon chain that is interrupted at one or more positions by ether oxygen, and/or amine nitrogen, at least one of said one or more atoms or groups participating in electron donor acceptor interactions being at a distance within the interval of 1-7 atoms from the positive nitrogen atom.

\* \* \* \* \*